Patented Sept. 18, 1923.

1,468,343

UNITED STATES PATENT OFFICE.

JOHN HENRY DELANEY, OF SAN FRANCISCO, CALIFORNIA.

PROCESS OF PRODUCING VERMICULATED WORK.

No Drawing. Application filed June 14, 1922. Serial No. 568,361.

*To all whom it may concern:*

Be it known that I, JOHN HENRY DELANEY, a citizen of the United States, and resident of San Francisco, county of San Francisco, State of California, have invented a new and useful Process of Producing Vermiculated Work, of which the following is a specification.

My invention relates primarily to building materials such as artificial stone work for the inside and outside of buildings, even arches, pillars, cornices, and all other like structures, including wall surfaces and any other examples where materials having the general characteristic qualities of plastic compositions are used.

The use of the invention is concerned with several important results, one of which has to do with the ornamentation of building structures. With reference to the ornamental feature, I propose to treat or otherwise handle materials such as plastic compositions in a manner as to leave their surfaces covered with a vermiculated work to give them the appearance of an antique structure, such as travertine.

For the purpose of illustrating the preferred manner of reducing the invention to practice I will refer to the preparation of the material for leaving the vermiculated work on the outer surface thereof for the purpose of simulating travertine and in this connection I find that satisfactory results may be realized in several different ways depending mostly on the particular nature of the result required. In all cases, however, I propose to use a material capable of generating gas in the presence of moisture or water and having the characteristic qualities of calcium carbide. I have selected calcium carbide due to the reaction which is set up when the same contacts with water or other liquid which is, of course, used in the preparation of all plastic compositions for building purposes. In utilizing this agent in the case of preparing a cast plastic block, I can either grease the inside of the mold and sprinkle or otherwise apply the calcium carbide to the sides so that it will adhere to the greased surface and when the plastic material is poured into the mold, a moistener or water contained in the material will set up a reaction with the calcium carbide while in confinement therewith causing gas to be generated and forming pockets, holes, pores or voids in the surface of the block as cast, which will leave the vermiculations or travertine effect. When preparing slabs from plastic materials where the mold is not used but only a smooth surface, such surface may be greased as in the case of the mold and sprinkled with the reactive agent such as calcium carbide and the same valuable results will be obtained. There are, of course, many other ways that the vermiculations can be produced by the use of my principle, for instance, in case of wall surfaces, after the plaster has been applied and is still damp or moist, the calcium carbide can be sprinkled over the surface and it will perform its intended use equally well. It is, of course, to be understood, that after the calcium carbide has worked, the ash remaining after the reaction has taken place may be washed out of the vermiculations by a stream of water or otherwise removed.

In some instances I have found it desirable to cut irregular shaped grooves or the like in the surface of the mold to leave so-called pockets into which the calcium carbide is put and in this way I am practically able to decide the vermiculated work prior to the casting of the material. If it is desirable to resort to this particular method for wall surfaces, I can just as well use a manually operated device having a smooth surface into which the so-called grooves are cut and filled with the calcium carbide so that the surface may be pressed against the wall for producing the vermiculation.

In referring to plastic composition it is, of course, appreciated that I include those materials usually classified as clay, plaster, gypsum, magnesite, cements or other fast or slow setting materials either in the pure state or mixed with other aggregates as a dry mix or mixed with water or other liquids.

I claim:

1. The herein described process of producing vermiculated work upon the surface of plastery materials, which consists in embedding in the surface of the plastery material before the same has set particles of material capable of generating gas in the presence of moisture to thereby produce voids in the surface of the plastery material for the purpose of ornamenting the same.

2. The herein described process of producing vermiculated work upon the surface of plastery materials, which consists in embedding in the surface of the plastery material before the same has set particles of calcium carbide to thereby produce voids in the surface of the plastery material for the purpose of ornamenting the same.

3. The herein described process of producing an imitation of natural travertine which consists in subjecting plastic materials to the action of a soluble chemical and arranging said chemical with respect to an intended order or arrangement of said plastic materials when placed upon a mold so that a chemical reaction is set up by contact with said chemical of moisture contained in said plastic materials to thereby establish a chemical disturbance of the plastic materials to produce voids in the ornamental or exposed surface of the finished product in simulation of voids in the natural travertine.

4. The herein described process of producing an imitation of natural travertine which consists in subjecting plastic materials to the action of calcium carbide and arranging said carbide with respect to an intended order of the plastic materials upon a mold so that a chemical reaction is set up through contact with said carbide of moisture contained in said plastic materials to thereby cause produced gases in confinement with said plastic materials to form voids therein and upon the exposed surface of the finished product in simulation of voids in the natural travertine.

5. The herein described process of producing an imitation of natural travertine which consists in subjecting plastic materials to the action of a soluble chemical and arranging said chemical with respect to an intended order or arrangement of said plastic materials when placed upon a mold so that a chemical reaction is set up by contact with said chemical of moisture contained in said plastic materials to thereby establish a chemical disturbance of the plastic materials to produce voids in the ornamental or exposed surface of the finished product in simulation of voids in the natural travertine, permitting the plastic materials to harden and set, and finally subjecting the hardened mass to the action of a cleansing agent to remove the residue of the chemical therefrom.

6. The herein described process of producing an imitation of natural travertine which consists in subjecting plastic materials to the action of calcium carbide and arranging said carbide with respect to an intended order of the plastic materials upon a mold so that a chemical reaction is set up through contact with said carbide of moisture contained in said plastic materials to thereby cause produced gases in confinement with said plastic materials to form voids therein and upon the exposed surface of the finished product in simulation of voids in the natural travertine, permitting the plastic materials to harden and set, and finally subjecting the hardened mass to the action of a cleansing agent to remove the residue of the chemical therefrom.

JOHN HENRY DELANEY.